3,297,670
PROCESS FOR REMOVAL OF SILVER NITRATE FROM SILVER NITRATE CONTAINING ACRYLONITRILE POLYMERS
Raymond J. Ehrig, Silver Spring, Md., assignor to W. R. Grace & Co., New York, N.Y., a corporation of Connecticut
No Drawing. Filed July 16, 1964, Ser. No. 383,253
5 Claims. (Cl. 260—88.7)

This invention relates to the removal or control of the silver nitrate content in polymers of acrylonitrile.

In summary, my invention comprises dissolving the silver nitrate containing polyacrylonitrile in dimethyl sulfoxide, and then precipitating the polyacrylonitrile by pouring the dimethyl sulfoxide solution into a non-solvent for the polymer (or vice versa), whereby the polymer is precipitated and the silver nitrate is left in solution. The polyacrylonitrile recovered contains less silver than before purification. Accurate control of the silver content can be obtained using the described procedures.

Metalized films and similar metalized polymeric articles are becoming increasingly important in this electronic age. Shielding for electronic and magnetic equipment, tape for magnetic recording devices, units in radiant heating structures, seat covers for automobiles, the construction of electrolytic condensers and wave guides for microwave applications are only some of the uses for these metalized polymeric articles.

It is known to me that silver nitrate containing polyacrylonitrile is produced, using silver nitrate containing polymerization catalysts. The polyacrylonitrile thus produced generally contains 0.4 to 30 percent by weight silver. The silver nitrate can be a solid added to the acrylonitrile monomer and it can be in aqueous solution. In solution phase, various photoinitiators and other initiating compounds, such as potassium persulfate can be present to effect polymerization. Under certain specific conditions such as elimination of free molecular oxygen no initiators are needed. However, no matter what polymerization catalysts or initiators are used, I have found that dimethyl sulfoxide is eminently suitable to control silver content.

The invention is further described by the following examples:

*Example 1*

A three-necked flask containing a thermocouple, condenser and gas inlet tube was completely deoxygenated by continual sparging overnight with argon.

A 66% $AgNO_3$ solution in water (weight/weight) has been previously prepared so that 1 ml. of solution contained 1.38 gms. of $AgNO_3$. 11.3 ml. of this solution, previously deoxygenated by bubbling argon therethrough was added to the flask. At room temperature (30° C.) 19.5 gms. of distilled acrylonitrile (previously deoxygenated), was added by a syringe under an inert atmosphere with stirring. This provided substantially 0.3:1 $AgNO_3$: acrylonitrile mole ratio. A homogeneous solution resulted, and an immediate exotherm of 15° C. was noted. The mixture became cloudy, indicative of insoluble polyacrylonitrile formation. Within 5 minutes white particulate solid was observed. Yield of polymer, which was determined to be polyacrylonitrile, was 8 gm. after 6 hours. The polymer was a white, grainy, particulate solid. The entire reaction was conducted under a blanket of argon gas.

A weighed amount of the polymer taken directly from the reaction medium, was analyzed by emission spectrography in the following manner: 0.1144 gm. of the polymer was taken in a 150 ml. beaker and destroyed by wet oxidation using 30% $H_2O_2$ and sulfuric acid. The sample was heated to sulfuric acid fumes, cooled and transferred to a 100 ml. volumetric flask. Sufficient yttrium-lanthanum were added as internal standards and the sample was diluted to volume. An emission spectrum was obtained, and compared to previously prepared synthetic standards, indicating a silver content of 25.1% by weight in the acrylonitrile polymer. 0.50 gm. sample of the silver containing polyacrylonitrile was then dissolved in 400 ml. of dimethyl sulfoxide, providing a .125% (weight/volume) solution. After complete dissolution was obtained, the dimethyl sulfoxide solution was slowly added to five times its volume of methanol. The polyacrylonitrile/dimethyl sulfoxide solution of 0.3% weight/ further with methanol and dried. The product weighed 0.38 gm. percent silver content, as determined using the analytical procedure above, was 0.6% by weight.

*Example 2*

In this example a silver nitrate acrylonitrile polymer containing hexene-1 was prepared using the procedure and equipment of Example 1. 11.25 ml. of the 66% (wt./vol.) solution of aqueous $AgNO_3$, 19.50 ml. of acrylonitrile and 37.50 ml. of hexene-1 were reacted. Polymer yield was 10 gms. after 20 minutes.

The polymer analyzed 26% silver (by weight before treatment with dimethyl sulfoxide. After one treatment with dimethyl sulfoxide-methanol (providing a polyacrylontrile/dimethyl sulfoxide solution of 0.3% weight/volume) the silver content was reduced to 4.0% by weight. A second treatment with dimethyl sulfoxide-methanol yielded a polymer containing 0.6% Ag by weight. The analytical procedure was the same as that given in Example 1.

*Example 3*

This example relates to the preparation of a silver-containing acrylonitrile-ethylene polymer catalyzed by a persulfate initiator. 100 ml. of a 66% by weight solution of $AgNO_3$ and 55.12 ml. of acrylonitrile were combined in a stainless steel reactor equipped with thermocouple, gas inlet port, etc. The reagents were not deoxygenated. Ethylene was pumped into the vessel at 140 p.s.i. $K_2S_2O_8$ was then added being an initiator of the acrylonitrile polymerization known in the art. Particulate polymer formed in the vessel and within 4 hours, a yield of 8.7 g. was obtained. Silver analyzed by the method of Example 1, was 24.1 weight percent. 5 gms. of silver-containing copolymer was dissolved in 900 ml. dimethyl sulfoxide, providing a 0.5% (weight/volume) solution. Polymer was reprecipitated in methanol, collected, washed with methanol, and dried. Percent by weight silver was analyzed to be 7.8%.

The preferred embodiments of my invention are as follows: A concentration of polyacrylonitrile in dimethyl sulfoxide is operable to about 1% (weight/volume). At this concentration, approximately 30 weight percent of the total silver present in the polymer will be removed. Since the relationship between concentration and silver removed is somewhat linear (e.g. 0.5% solution will remove about 68% silver, 0.3% will remove about 85% silver, and 0.1 will remove about 98% silver) it can therefore be predicted what volume of dimethyl sulfoxide is needed to dissolve a known weight of polyacrylonitrile to remove a certain percentage of the total silver content.

Although the solvent used to reprecipitate the polyacrylonitrile was methanol, any of the known non-solvents for polyacrylonitrile can be used in this invention. Both solvents and non-solvents for silver nitrate may be used as a precipitating medium. This is the advantage for using dimethyl sulfoxide since it retains the silver nitrate in solution while allowing the polymer to precipitate.

A great many liquids are known which are non-solvents for polyacrylonitrile and which are solvents for silver nitrate, viz., methanol and the other lower alkanols, water, glycerin, the lower alkyl ethers (especially diethyl ether), and the like.

The polymerization system and conditions for polymerizing acrylonitrile in the presence of silver nitrate can be any of the many now known to the art. As is shown in the examples, since the polymerization systems differ among themselves only in the amount of silver incorporated in the final polymer, a simple adjustment of the dimethyl sulfoxide concentration will result in the desired level of silver content.

In certain polymerization systems, e.g., those in which the $AgNO_3$ catalyst concentration is 10% by weight/weight in water, polyacrylonitrile containing less than 1–2% silver by weight is obtained. In such cases, concentrations of polyacrylonitrile in dimethyl sulfoxide of from 0.5–1.25% (weight/volume) will remove 100% of the silver. This is true not only for polyacrylonitrile compositions which contain less than 1–2% by weight after original polymerization but also for those polyacrylonitrile compositions which have been treated with dimethyl sulfoxide to this low silver content. In other words, when the final products in Examples 1, 2, and 3 were treated once more in 1.0% (weight/volume) solutions of polyacrylonitrile/dimethyl sulfoxide, all three samples contained 0% silver.

Thus it can be seen that concentrations of polyacrylonitrile in dimethyl sulfoxide chosen from the range of 0.1 to 1.25% (weight/volume) are operable in this invention. The concentration range of 0.1 to 1% is preferable when silver is present in polyacrylonitrile in weight percentages exceeding 2 percent, and the concentration range of 0.5 to 1.25% is preferable when silver content of the polymer is less than 2 percent. However, the range of concentrations is purposely broad, since the ultimate choice is dependent on each individual calculation.

*Example 4*

In this example a silver nitrate acrylonitrile polymer containing ethylene was prepared using the procedure and conditions of Example 3, except that a 10% by weight solution of $AgNO_3$ was used instead of the 66% solution of Example 3. The polymer produced contained 0.4% (by weight) silver. When 5 gms. of the polymer were dissolved in 400 ml. of dimethyl sulfoxide (1.25% weight/volume solution), and precipitated in methanol, the polymer contained 0% silver when analyzed by emission spectrography.

What is claimed is:

1. A process for the removal of silver nitrate in silver nitrate-containing polyacrylonitrile resulting from the silver nitrate catalyzed polymerization of acrylonitrile which comprises dissolving the said silver nitrate-containing polyacrylonitrile in dimethyl sulfoxide, and then precipitating the polyacrylonitrile by adding to the resultant mixture a liquid which is a non-solvent for polyacrylonitrile and which is a solvent for silver nitrate, and recovering the thus purified polyacrylonitrile.

2. The process of claim 1 in which polyacrylonitrile is dissolved in dimethyl sulfoxide to form a solution of 0.1 to 1.25% weight per volume.

3. The process of claim 2 in which the silver nitrate content of the polyacrylonitrile, measured as silver is 0.4 to 30% by weight.

4. The process of claim 1 in which the liquid is chosen from the group consisting of methanol, water, glycerin, and lower alkyl ethers.

5. The process of claim 4 in which the liquid is methanol.

References Cited by the Examiner

UNITED STATES PATENTS 2,473,549  6/1949  Smith _____ 260—88.7
2,648,647  8/1953  Stanton et al. _____ 260—88.7

OTHER REFERENCES

Henglein et al.: Chem. Abs. 56, 10385b (1962).
Cornish: Die Makr. Chemie 64, 210–212 (1963).
Schnecko: Die Makr. Chemie 66, 19–20 (1963).

JOSEPH L. SCHOFER, *Primary Examiner.*

JAMES A. SEIDLECK, *Examiner.*

H. WONG, *Assistant Examiner.*